(12) United States Patent
Caretta et al.

(10) Patent No.: US 6,763,288 B2
(45) Date of Patent: Jul. 13, 2004

(54) METHOD AND SYSTEM FOR MONITORING AND/OR CONTROLLING BEHAVIOR OF A VEHICLE BY MEASURING DEFORMATIONS OF ITS TIRES

(75) Inventors: Renato Caretta, Gallarate (IT); Riccardo Cesarini, Bergamo (IT); Federico Mancosu, Milan (IT)

(73) Assignee: Pirelli Pneumatici S.p.A., Milan (IT)

(*) Notice: Subject to any disclaimer, the term of this patent is extended or adjusted under 35 U.S.C. 154(b) by 0 days.

(21) Appl. No.: 10/227,226

(22) Filed: Aug. 26, 2002

(65) Prior Publication Data

US 2003/0050743 A1 Mar. 13, 2003

Related U.S. Application Data

(63) Continuation of application No. 09/625,350, filed on Jul. 25, 2000, now abandoned.
(60) Provisional application No. 60/147,422, filed on Aug. 6, 1999.

(51) Int. Cl.$^7$ .................................................. G06F 7/00
(52) U.S. Cl. ........................... 701/1; 701/53; 340/442; 340/940; 73/146.2
(58) Field of Search ...................... 701/1, 53; 340/442, 340/444, 940; 73/146.2, 146.8

(56) References Cited

U.S. PATENT DOCUMENTS

| 5,087,072 A | 2/1992 | Kawarasaki | 280/5.503 |
| 5,247,831 A | 9/1993 | Fioravanti | 73/178 R |
| 5,463,374 A | 10/1995 | Mendez et al. | 340/442 |
| 5,578,984 A | 11/1996 | Nakajima | 340/444 |
| 5,656,993 A | 8/1997 | Coulthard | 340/442 |
| 5,731,754 A | 3/1998 | Lee, Jr. et al. | 340/447 |
| 5,734,319 A | 3/1998 | Stephens et al. | 340/442 |
| 5,811,672 A | 9/1998 | Mancosu et al. | 73/146 |

FOREIGN PATENT DOCUMENTS

| DE | 39 16 176 | 11/1990 |
| EP | 0887211 | 12/1998 |
| EP | 0689950 | 4/1999 |
| WO | WO 93/25400 | 12/1993 |
| WO | WO 01/11330 | 2/2001 |

OTHER PUBLICATIONS

F. Celeri et al., "A Method for the Evaluation of the Lateral Stability of Vehicles and Tires," Society of Automotive Engineers, Inc., International Automobile Tire Conference (Oct. 22–24, 1974).

*Primary Examiner*—Gertrude A. Jeanglaude
(74) *Attorney, Agent, or Firm*—Finnegan, Henderson, Farabow, Garrett & Dunner, L.L.P.

(57) ABSTRACT

A method for monitoring and/or controlling the behavior of a vehicle including at least one wheel includes determining one or more values of deformation of a tire of the at least one wheel by measuring the one or more values using a first signal emitted between a rim of the at least one wheel and a casing of the tire, providing a database comprising predetermined values of deformation of the tire that correspond to a behavior of the at least one wheel, comparing the measured one or more values of deformation with one or more of the predetermined values of deformation, and emitting a second signal dependent on at least one result of the comparison for monitoring and/or controlling the behavior of the vehicle. The one or more values of deformation are determined in vertical, transverse, and longitudinal directions or along the axes of a three-dimensional Cartesian coordinate system.

44 Claims, 10 Drawing Sheets

METHOD AND SYSTEM FOR MONITORING AND/OR CONTROLLING BEHAVIOR OF A VEHICLE BY MEASURING DEFORMATIONS OF ITS TIRES

CROSS-REFERENCE TO RELATED APPLICATIONS

This application is a continuation of U.S. patent application Ser. No. 09/625,350, filed Jul. 25, 2000, now abandoned in the U.S. Patent and Trademark Office, the contents of which are relied upon and incorporated herein by reference; additionally, Applicants claim the right of priority under 35 U.S.C. §119(a)–(d) based on patent application Ser. No. 99114962.6, filed Jul. 30, 1999, in the European Patent Office; further, Applicants claim the benefit under 35 U.S.C. §119(e) based on prior-filed, copending provisional application No. 60/147,422, filed Aug. 6, 1999, in the U.S. Patent and Trademark Office.

BACKGROUND OF THE INVENTION

1. Field of the Invention

The present invention relates to a method and system for monitoring the operating conditions of a tyre fitted on a vehicle.

The present invention relates to the possibility of carrying out actions, whether automatic or actuated or commanded by the driver, on the vehicle driving and/or control system to modify the vehicle's behaviour according to measurements made on the tyre or on the wheel.

2. Description of the Related Art

Devices for measuring characteristic parameters such as pressure and temperature in a tyre are known from the prior art.

Patent application EP 887.211 describes a tyre monitoring system comprising a sensor, located inside the tyre, which is enabled to create an electrical pulse when the said sensor passes through the footprint area formed by the contact of the tyre with the ground during rotation. The system according to this patent also comprises means for measuring the ratio of the duration of the said electrical pulse to the duration of a revolution of the tyre and means for transmitting the said ratio to a processing unit within the vehicle.

In particular, the sensor is located inside the tread of the tyre, in such a way that the said electrical pulse has a first peak at the point where it enters the footprint area and a second peak at the point where it leaves the footprint area.

According to the teaching of this patent, the ratio of the time elapsed between the two peaks to the time taken for a complete revolution of the tyre can be used to discover the degree of flattening of the tyre during the operation of the vehicle.

This is because the sensor detects the instant of entry into the footprint area and the instant of exit from this area. It is thus possible to measure the length of this area, if the angular velocity of the tyre and its radius are known. The length of the footprint area is then related to the flattening of the tyre, which is a critical parameter of the tyre in use, particularly in tyres for heavy motor vehicles.

Patent application EP 0,689,950 describes a different method for monitoring parameters of a tyre, such as its pressure and temperature. In particular, a self-powered programmable electronic device located on the inner surface of a tyre or on its fitting rim is used. This device can be used to monitor and store the pressure, the temperature and the number of rotations of the tyre, and may comprise an extensometer, whose output signal measures the flexion of the inner surface of the tread strip, or an accelerometer which measures the intensity of the acceleration to which the tread strip is subjected. Additionally, the device is activated by an external signal at radio frequencies and transmits an alarm signal if a predetermined limit of the measured values is exceeded.

There are also known methods for measuring deformations of the tread strip of a tyre during movement and transmitting it to a receiver located on the vehicle.

Patent application WO 93.25400 describes a sensor located within the tread strip of a tyre and capable of transmitting a signal directly dependent on the aforesaid deformations, comprising a resonant circuit which oscillates at a predetermined characteristic frequency This resonant frequency is affected by the deformations of the tread strip during movement, and the sensor transmits electromagnetic waves proportional to these variations of the resonant frequency. These electromagnetic waves are received by a processing unit connected to a receiver located inside the vehicle.

U.S. Pat. No. 5,247,831 describes a method for monitoring the behaviour of the footprint area of a tyre during the operation of the vehicle to optimize the driving of the vehicle. In particular, a piezoelectric sensor consisting of longitudinal strips of piezoresistive rubber is inserted into the tread strip. This sensor is capable of measuring the deformations of the tread strip, since these strips change their electrical resistance as a function of the said deformations.

There are also known methods and devices for acting on the vehicle driving and/or control system, particularly on the devices which control the suspension systems of the vehicle, to control its behaviour according to the information obtained from the axles of the vehicle or from the hubs of the wheels.

The publication "A method for the evaluation of the lateral stability of vehicles and tires" by the Società Pneumatici Pirelli S.p.A., presented at the "International Automobile Tire Conference" at Toronto, Canada, on Oct. 22, 1974, illustrates a method of measuring the dynamic behaviour of the vehicle as a function of the forces developed by the various types of tyre set-up and the various conditions of the road surface.

The publication primarily refers to three forces which determine the dynamic behaviour of a tyre, specifically the vertical force, the longitudinal force and the lateral force.

The vertical force is that due to the dynamic load to which the tyre is subjected. The longitudinal force is that due to the torque applied to the axis of the tyre as a result of an acceleration or braking of the vehicle. The lateral force is the resultant of the force due to the characteristic angles of the suspension systems of the vehicle (camber and toe-in) and to the angular thrust (ply-steer) developed by the layers of inclined cords of the ply structure of the tyre, which are also present in normal operating conditions in straight-line motion, and of the thrust generated by the centrifugal force in drifting conditions. The sum of the forces developed by the four tyres generates a resultant system applied to the centre of gravity of the vehicle, which balances the inertial actions and determines the attitude of the vehicle as a function of the characteristics of the suspension systems of each axle. This resultant system is measured by suitable accelerometers, one of which is located on the front axle and one on the rear axle of the vehicle. The article includes a series of graphs showing the centripetal acceleration or the centripetal force applied to the centre of gravity of the vehicle as a function of the angle of skid of the corresponding axle. The graphs plotted for various ground conditions and with various types of tyres can be used to find the behaviour of the vehicle provided with a predetermined tyre set-up and to determine any lateral skidding in either the front or the rear axle in cornering.

U.S. Pat. No. 5,087,072 illustrates a system of what is called active suspension, consisting of four cylinders, one being provided for each wheel between the vehicle body and the hub of the wheel. These cylinders are powered by a hydraulic system operated by an electronic control unit. The system comprises a set of sensors for measuring the height of the vehicle above the ground for each suspension unit, and for making this measurement available to the electronic suspension control unit. The control unit operates the active cylinders separately according to the measurement of these heights.

SUMMARY OF THE INVENTION

The Applicant has observed that the aforesaid known systems of controlling the behaviour of a vehicle are based on systems of forces measured at the hubs of the wheels, and the systems of measuring the deformations of the tyre are based on the measurement of the deformations undergone by the tread strip in the footprint area of the tyre.

The Applicant has observed that the values measured in the cited art cannot be related in a unique way to the operating conditions of a tyre and, more precisely, to the system of forces developed by a tyre in each operating condition.

The present invention arises from the Applicant's realization that the measurement of deformations of the tread strip, particularly in the footprint area of a tyre, cannot be used to identify the system of forces developed by the tyre and the deformations of the casing of the tyre connected to it and representative of the behaviour of the tyre. This behaviour is of considerable importance, especially during certain special events, such as braking or acceleration of the vehicle, drifting conditions, and variations of load on the tyre.

In accordance with the above, the present invention arises from the Applicant's realization that the measurement of the deformations of the casing, since these are related in a unique way to the system of forces developed by the tyre in use, enables appropriate corrective actions to be taken on the vehicle drive and/or control system by means of the comparison of the said measured deformations with predetermined values thereof.

More specifically, the present invention relates to the control of the behaviour of a vehicle in motion by means of the measurement of characteristic deformations of the tyre during the movement of the vehicle, in such a way as to determine the operating conditions of the tyre by comparison with predetermined values representing the behaviour of the tyre in the various predicted states of deformation. According to the invention, the result of this comparison is used to generate a signal corresponding to a predetermined, preferably automatic, response of one or more devices controlling at least a mechanism for controlling the behaviour, including attitude, of the vehicle in motion, to keep the aforesaid behaviour of the vehicle within the limits of a predetermined behaviour, or to bring it back within these limits.

The Applicant has realized that, simply by knowing with certainty the behaviour of each tyre, in other words the function which relates the force developed by the tyre to its deformation, it is possible to act in the aforementioned way on the control devices of the vehicle in order to modify its behaviour, including attitude, in an optimal way.

It has been found that the measurements of the deformation of the casing structure of the tyre, at a given inflation pressure, in a triad of Cartesian coordinates, in other words, the deformation in the vertical direction, the deformation in the transverse direction and the deformation in the longitudinal direction, correspond in a unique or at least a reproducible way to the corresponding vertical, lateral and longitudinal forces which act on the tyre (or, in other words, to the forces which the tyre exchanges with the ground).

The Applicant has found that these deformations can be measured from the interior of the tyre independently of the events in the footprint area or, more generally, the interface conditions between the tyre and the ground.

It has also been found that the said predetermined values representing the behaviour of the tyre in the various predicted states of deformation can advantageously be:

calculated by simulation in a computer, measured in the laboratory by means of special test machines which can be used to plot force-deformation graphs in various conditions, obtained for each tyre on the vehicle in use or on a simulator apparatus.

In a first aspect, the present invention relates to a method for controlling the movement of a vehicle including at least one wheel provided with a tyre, the said method comprising the steps of:

determining the deformations of the said tyre by measuring them by means of the reflection of a signal emitted inside the wheel;

providing a database containing values of deformation of the tyre which correspond to a predetermined behaviour of the wheel;

comparing the said measured deformations with the said predetermined values of deformation; and emitting a signal dependent on the result of the said comparison, to be used for controlling the behaviour of the vehicle.

In particular, the aforesaid method is implemented by means of the following steps:

measuring the extent of the characteristic deformations of the casing profile of at least one tyre fitted on the vehicle, at a given inflation pressure;

comparing the values of these characteristic deformations with stored values representing the behaviour of the tyre in the measured state of deformation; and generating a signal for acting on at least one device regulating at least one mechanism for controlling the behaviour, including attitude, of the said vehicle in motion, corresponding to the action to be taken on the said mechanism to keep the said behaviour of the vehicle within the limits of a predetermined behaviour or to bring it back within these limits.

In a different aspect, the present invention relates to a system for controlling the behaviour of a vehicle in motion, comprising:

at least one unit for measuring at least one quantity correlated with a force transmitted to the ground by a tyre of the said vehicle;

a database comprising predetermined values representing the behaviour of the said tyre in relation to the said force; and a data processing unit communicating with the said at least one measuring unit, capable of comparing the values of this quantity with the said values of the said database, and of emitting a signal to be used for controlling the behaviour of the vehicle.

The said signal may be an alarm signal or a signal for controlling a mechanism controlling the behaviour, including attitude, of the said vehicle to keep the said behaviour of the vehicle within the limits of a predetermined behaviour or to bring it back within these limits.

Preferably, the said signal acts on a device regulating the said control mechanism.

Preferably, the measuring unit is capable of measuring the rotation velocity of the tyre and/or its inflation pressure.

In a preferred embodiment of the system according to the invention, the aforesaid measuring unit comprises at least one sensor inserted into the supporting rim of the tyre and also, if necessary, a reflecting element located on the inner surface of the said tyre.

In a particular aspect of the invention, the quantity measured is the deformation of the casing profile of the tyre in a predetermined direction, preferably selected from the radial direction, the transverse direction and the circumferential direction.

In a further aspect, the present invention relates to a pneumatic wheel for vehicles, comprising:

a supporting rim which can be associated with a hub of the vehicle;

a tyre fitted on the said rim, comprising a casing structure provided with a crown portion extending axially between a pair of axially-opposed sidewalls, terminating in beads for joining the said tyre to the corresponding supporting rim, the said casing being provided with at least one reinforcing ply, having terminal flaps engaged with corresponding annular reinforcing structures embedded in the said beads, which forms a toroidal profile of the said casing;

an emitter of a signal which is to be reflected within the said tyre; and a receiver of the said signal for the measurement of a quantity correlated with a force transmitted to the ground by the said tyre.

In a preferred embodiment of the wheel, the emitter and the receiver are integrated into a single sensor.

Even more preferably, this wheel comprises at least one unit for transmitting the aforesaid measurement to a data processing unit external to the said wheel.

BRIEF DESCRIPTION OF THE DRAWINGS

Further characteristics and advantages of the present invention can be found in greater detail in the following description, with reference to the attached drawings, provided solely for explanatory purposes and without any restrictive intent, which show.

DETAILED DESCRIPTION OF THE PREFERRED EMBODIMENTS

Figure 1:
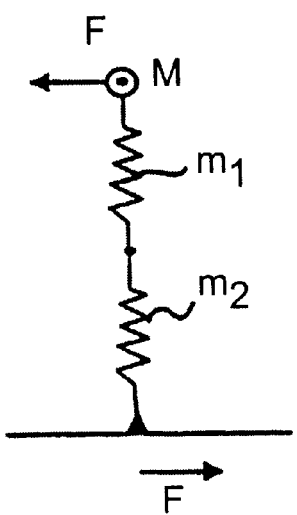
in FIG. 1, a schematic diagram of a pneumatic wheel.

FIG. 1 shows schematically the structure of a wheel with two springs m1 and m2 fitted in series between the hub M of the vehicle and the surface G of the ground.

The spring m1 represents schematically the casing structure of the tyre, while the spring m2 represents schematically the structure of the tread strip, which has its own specific elasticity, dependent on the visco-elastic characteristics of the mixture and on the geometrical characteristics of the tread pattern.

The force F applied to the footprint area of the tyre is balanced by an equal and opposite force F applied to the wheel hub. Without knowing the behaviour of m1, it is impossible to know the value of the deformation corresponding to the force acting on m1.

In other words, it is not possible to deduce the deformed configuration of the casing in a unique way from the measurements made on the footprint area. Similarly, it is not possible to determine in a unique way the deformation of the footprint area, which depends on parameters which are frequently unknown, particularly the value of the coefficient of friction between the tyre and the ground.

The Applicant has realized that the deformed casing profile, at a given inflation pressure, in itself describes the actual behaviour of the tyre in motion.

Thus it is possible to determine in advance, for each type of tyre and for each value of inflation pressure, the deformations which the tyre undergoes in a triad of Cartesian coordinates, according to the stresses applied to it, in various operating situations, particularly with different values of the coefficient of friction and with different values of the angle of drift.

The comparison between the deformations of the casing profile measured in tyres in use and the predetermined deformations, conveniently organized in a database, can be used to generate appropriate corrective actions on the various devices or systems for controlling the behaviour of the vehicle to which the tyres are fitted, to keep the said behaviour of the vehicle within the limits of a predetermined behaviour, or to bring it back within these limits. This is particularly true if the behaviour, including attitude, of the vehicle in response to the forces applied to the wheel hubs is known for the vehicle in question.

The aforesaid systems include, for example, variable adjustment systems of the suspension units, an anti-lock braking system (ABS), an engine and traction control system (antiskid), a stability control system (ESP), an active systems for controlling the motion of suspended weights (ABC) and non-suspended weights, and systems of dynamic regulation of the angles of "camber" and/or toe-in.

The aforesaid database may advantageously be supplied by the tyre manufacturer as a component of a vehicle behaviour control system.

Significant parameters for the purposes of the interpretation of the measurements and the aforesaid comparison of the deformations of the tyre and of the nature and extent of the corrections to be made by means of the aforesaid devices or control systems are the value of the tyre inflation pressure and the velocity or acceleration of each wheel.

For the purposes of the present invention, the aforesaid deformations of the casing profile are defined thus:

flattening ($X_1$): the direct deformation along a vertical axis or any axis perpendicular to the road surface;

lateral displacement or skid or drift ($X_2$): the direct deformation along the axis of rotation of the tyre; and longitudinal creep ($X_3$): the direct deformation along the circumferential direction, in other words, the direction of rolling of the tyre.

The measurements of these deformations are expressed as variations ($\Delta$) of $X_1$, $X_2$, $X_3$ with respect to corresponding values measured on the equilibrium profile of the tyre at a specific inflation pressure.

The comparison with predetermined values of these deformations in relation to measured and controlled forces applied to the tyre, preferably with the additional knowledge of the rotation velocity of each wheel, can be used to act automatically and/or under the control of the vehicle driver, for pairs of tyres or all tyres, on the aforesaid control devices or systems, in order to bring the values of the said deformations $X_1$, $X_2$, $X_3$ back within predicted and predetermined limits, to achieve a better behaviour of the vehicle in predetermined, and sometimes critical, situations.

Figure 2:
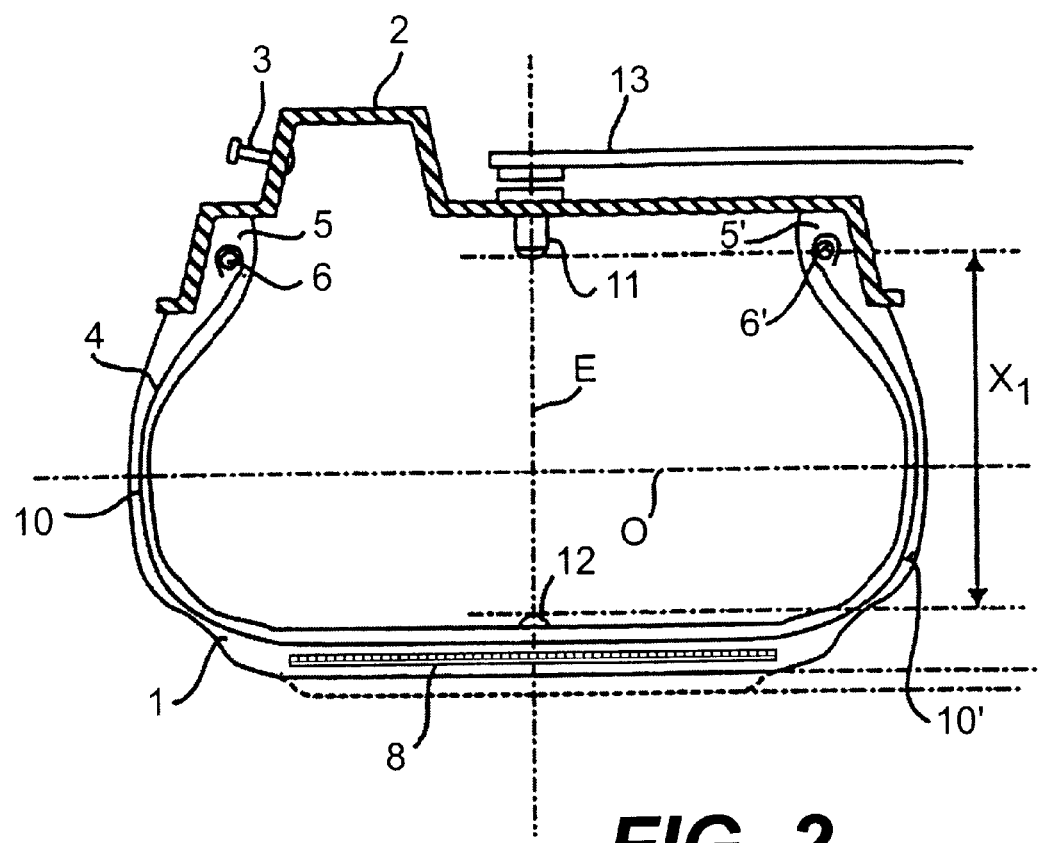
in FIG. 2, a transverse section through a tyre fitted on its supporting rim under a static load.

FIG. 2 shows, by way of example, a wheel comprising a tyre 1, of the type conventionally called "tubeless", and a supporting rim 2. This tyre 1 is inflated by means of an inflation valve 3 located, for example, in a known way, on the channel of the said rim.

The tyre 1 consists of an internally hollow toroidal structure formed by a plurality of components, and primarily of a casing ply 4, made of fabric or metal, having two beads 5 and 5' each formed along an inner circumferential edge of the casing to secure the tyre to the corresponding supporting rim 2. A pair of annular reinforcing cores, called bead wires, 6 and 6', which are circumferentially non-extendible, inserted in the said beads (at least one bead wire per bead as a rule) is also provided.

The casing ply includes a supporting structure comprising fabric or metal cords, extending axially from one bead to the other to form a toroidal structure which has each of its edges associated with a corresponding bead wire.

In tyres of the type known as radial, the aforesaid cords lie essentially in planes containing the axis of rotation of the tyre.

An annular superstructure, known as the belt structure 8, is placed on the crown 7 of this casing, and normally consists of one or more strips of rubberized fabric wound so that they overlap each other and form what is called a "belt pack", and a tread strip 9 of elastomeric material, wound around the belt pack, impressed with a relief pattern for rolling contact of the tyre with the road. Two sidewalls 10 and 10', of elastomeric material, each extending in the radial direction towards the outside from the outer edge of the corresponding bead, are additionally placed on the casing in lateral axially-opposed positions.

In tyres of the type known as "tubeless", in other words, those not requiring the use of air chambers when in operation, the inner surface of the casing is normally covered with what is known as a "liner", in other words, one or more layers of elastomeric material impermeable to air. Finally, the casing may comprise other known elements such as edges, strips and fillers according to the specific design of the tyre.

The forces transmitted by the tyre to the ground in a given situation, static or dynamic, are associated with the deviations of the casing profile in use from the basic inflated profile of the casing.

The profile of the casing in use is also described by the term "deformed configuration of the casing", while the basic inflated profile of the casing, in other words, that which the casing has in the tyre fitted on the rim where it is to be used and inflated to its nominal operating pressure, in the absence of a load, is termed, albeit incorrectly, the equilibrium profile.

For the purposes of the present invention, the term "casing profile" signifies the profile along the neutral axis of the casing plies in the cross section of the tyre. In particular, the casing profile describes the deformed configuration of the said tyre under the effect of the system of forces acting on it.

FIG. 2 shows, in particular, the radial distance $X_1$ along the equatorial plane E of the tyre between the inner surface of the rim 2 and the inner surface of the tyre in the area of the crown 7. The flattening undergone by the tyre under load is represented by the decrease of $X_1$ with respect to the corresponding value on the equilibrium profile. In the present description, for the sake of simplicity, $X_1$ will be defined as the flattening.

This distance is inversely proportional to the load exerted by the vehicle on the tyre, and depends both on the inflation pressure of the tyre and on the structural characteristics of the tyre. In static conditions, there is no dynamic load, but simply the static load (weight) bearing on the wheel.

Figure 3:
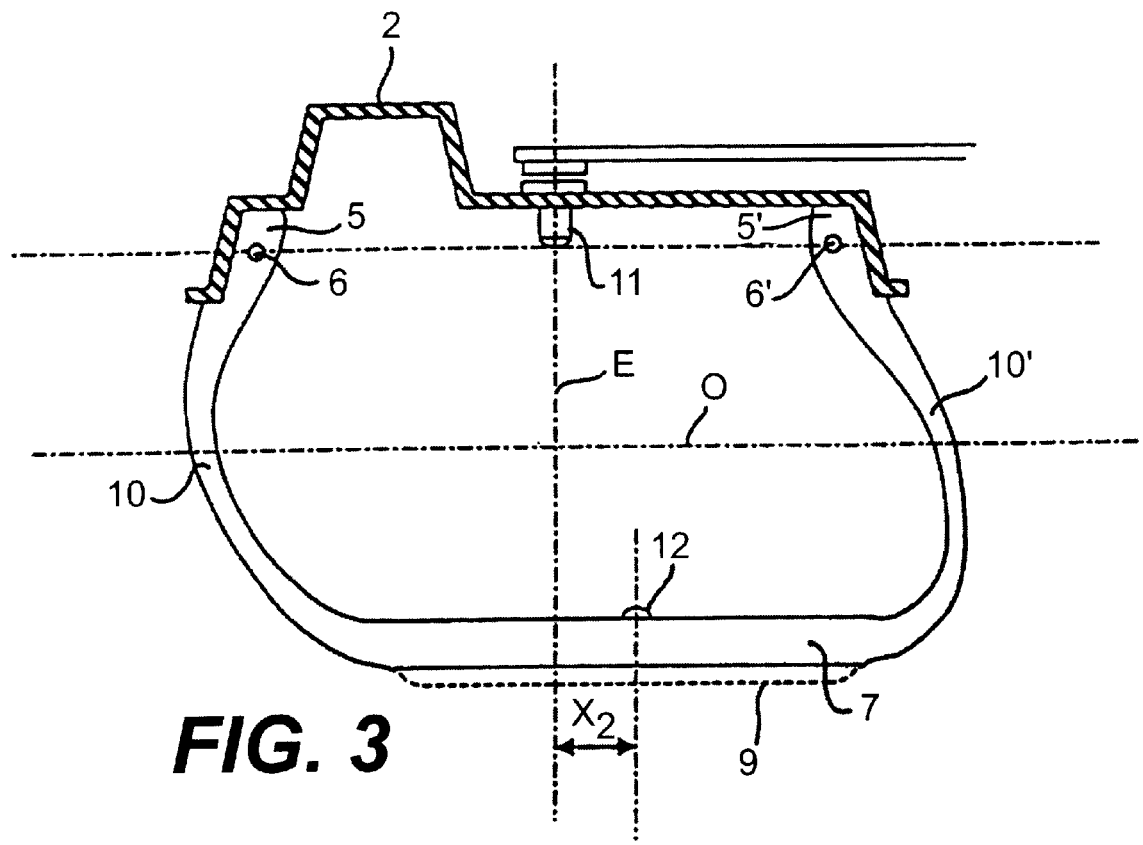
in FIG. 3, a transverse section through a tyre fitted on its supporting rim in conditions of lateral drift.

FIG. 3 shows, in particular, for a tyre operating in drifting conditions, the lateral displacement $X_2$, represented by the displacement, within the cross section of the tyre, in a transverse direction with respect to the direction of motion, identified in FIGS. 2 and 3 by the letter O, of a point which lies on the inner surface of the tyre on the equatorial plane, with respect to a point which lies on the midline plane of the rim.

The displacement $X_2$ is closely dependent on the structural characteristics of the tyre as a function of the lateral force exerted on the tyre during cornering. In this situation, the casing of the tyre undergoes a deformation in its midline plane, so that the portion of tread in contact with the ground, which has a substantially elliptical configuration during travel in a straight line, takes on what is known as a "kidney bean" configuration which subjects the sidewalls of the tyre to different stresses, with consequent lateral displacement of the centre of gravity of the tyre towards the inner side of the corner around which it is travelling.

Figure 11:
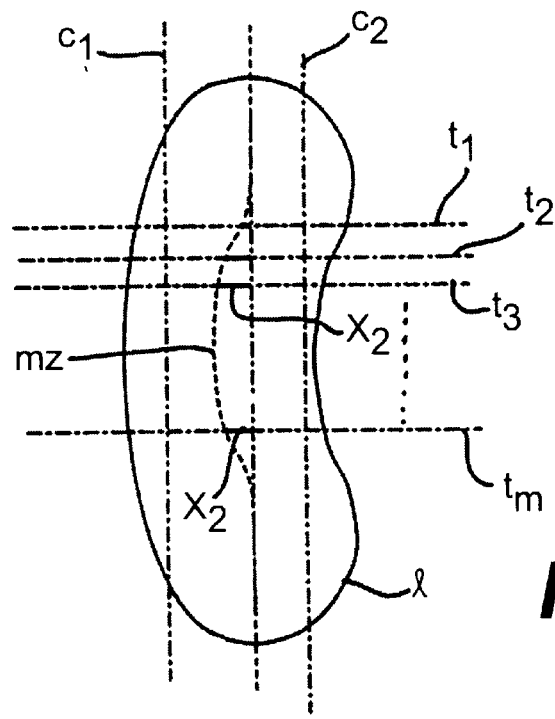
in FIG. 11, the footprint area of the tyre, modified to a kidney-bean shape, with the paths of the bead wires, the mid-line of the tread strip, and a series of radial planes, with the corresponding value of $X_2$ shown for each of these.

It should be noted that the deformed casing profile varies with the variation of the radial plane in question, as shown in FIG. 11. This reaches a maximum in a certain section of the footprint area, which is a function of the angle of drift of the tyre. Consequently, the corresponding value of $X_2$ varies over time as a function of the position of the section in which it is measured. This is because different sections along adjacent planes show a different deformation of the casing profile.

More specifically, FIG. 11 shows the outline k of the footprint area modified into a kidney-bean shape, the paths $c_1$ and $c_2$ of the bead wires, the midline mz of the tread strip and a set of radial planes $t_1$, $t_2$, $t_3$. . . $t_n$ which show the variation of $X_2$ in the passage from one plane to another.

Figure 4A:
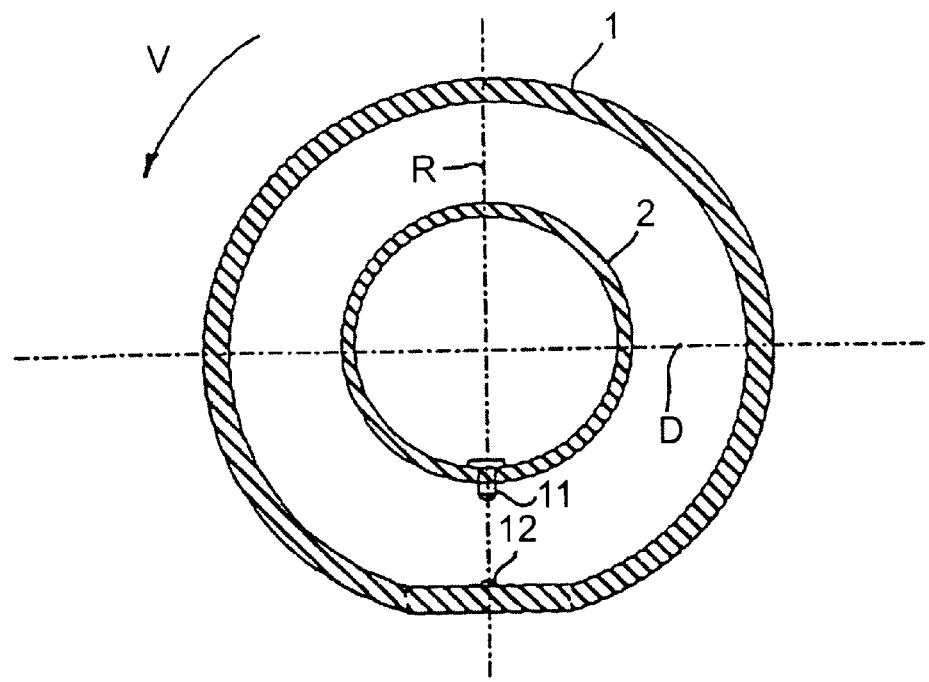
in FIGS. 4*a*, 4*b*, a longitudinal section through a tyre fitted on its supporting rim in uniform (FIG. 4*a*) and braking (FIG. 4*b*) conditions of motion.
Figure 4B:
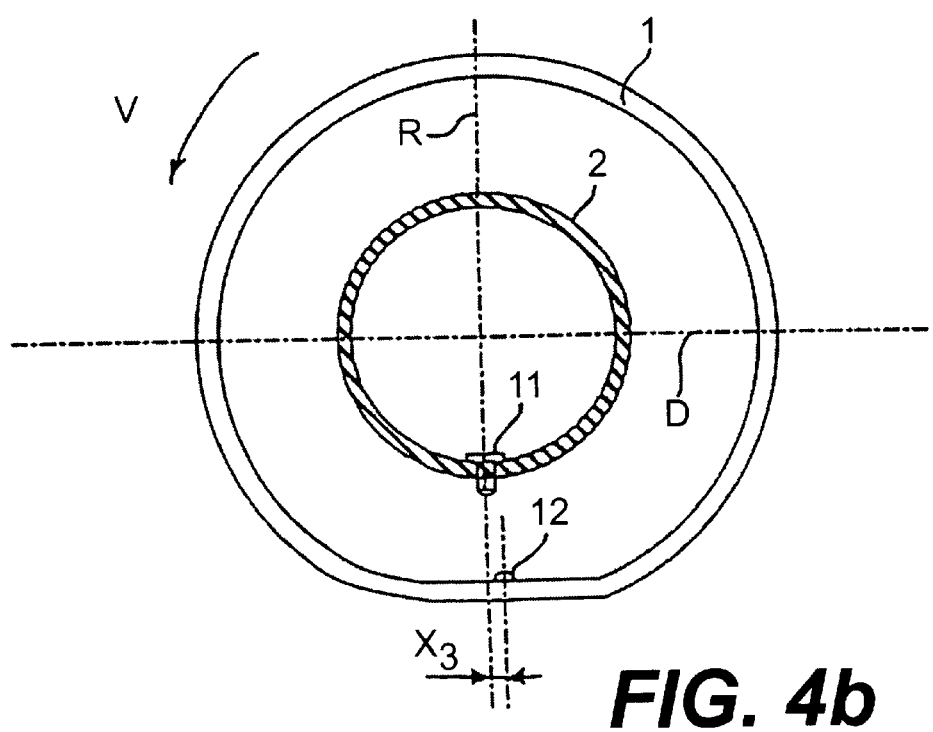

FIG. 4a shows a longitudinal section through a tyre which rolls as shown by the arrow V at uniform velocity, while FIG. 4b shows a longitudinal section of the same tyre which rolls as shown by the arrow V during a deceleration due, for example, to braking. FIG. 4b shows in detail the longitudinal creep $X_3$ in the direction of rolling of the tyre, in other words in the direction corresponding to the motion of the vehicle (identified in FIGS. 4a and 4b by the letter D), between a point on the inner surface of the tyre and the corresponding point on the rim in the equatorial plane of the tyre.

It should be noted that the creep $X_3$ and the displacement $X_2$ are measurements only of relative displacements between the casing and rim. In drifting, as in braking or acceleration, there are additional factors due to the flexibility of the elastomeric material which forms the tread strip of the tyre and the pattern formed in the said strip. In other words, if the tyre has a tread strip formed with blocks, the creep and transverse displacement of the ground contact surface of the tread strip with respect to the rim also depend on the flexibility of the blocks.

The Applicant has discovered that the variations of the three parameters described above, preferably measured on several occasions for a predetermined period of time, more preferably measured in a time interval of less than a thousandth of a second in each case, combined with the measurement of the inflation pressure of a tyre when in use and preferably also the rotation velocity of the tyre, are sufficient to determine the behaviour of each tyre in motion fitted on the vehicle, and to predict the behaviour of the said vehicle in the absence of actions taken to modify its behavior, including attitude.

This is because, when $X_1$ is measured and the inflation pressure and rotation velocity of the tyre are known, it is possible to determine the dynamic load ("vertical force") to which a tyre is subjected when in motion. The load may, for example, have a direct effect on the vehicle's roadhandling, since an incorrect distribution of the load over the four wheels may cause a loss of adhesion in one or more wheels, for example, in cornering or braking on a dry or wet road.

The knowledge of this parameter is of fundamental importance for the control of the vehicle's behaviour, since, in the aforesaid operating conditions, there is a transfer of the load between the axles and/or between the tyres of a single axle.

Figure 8:
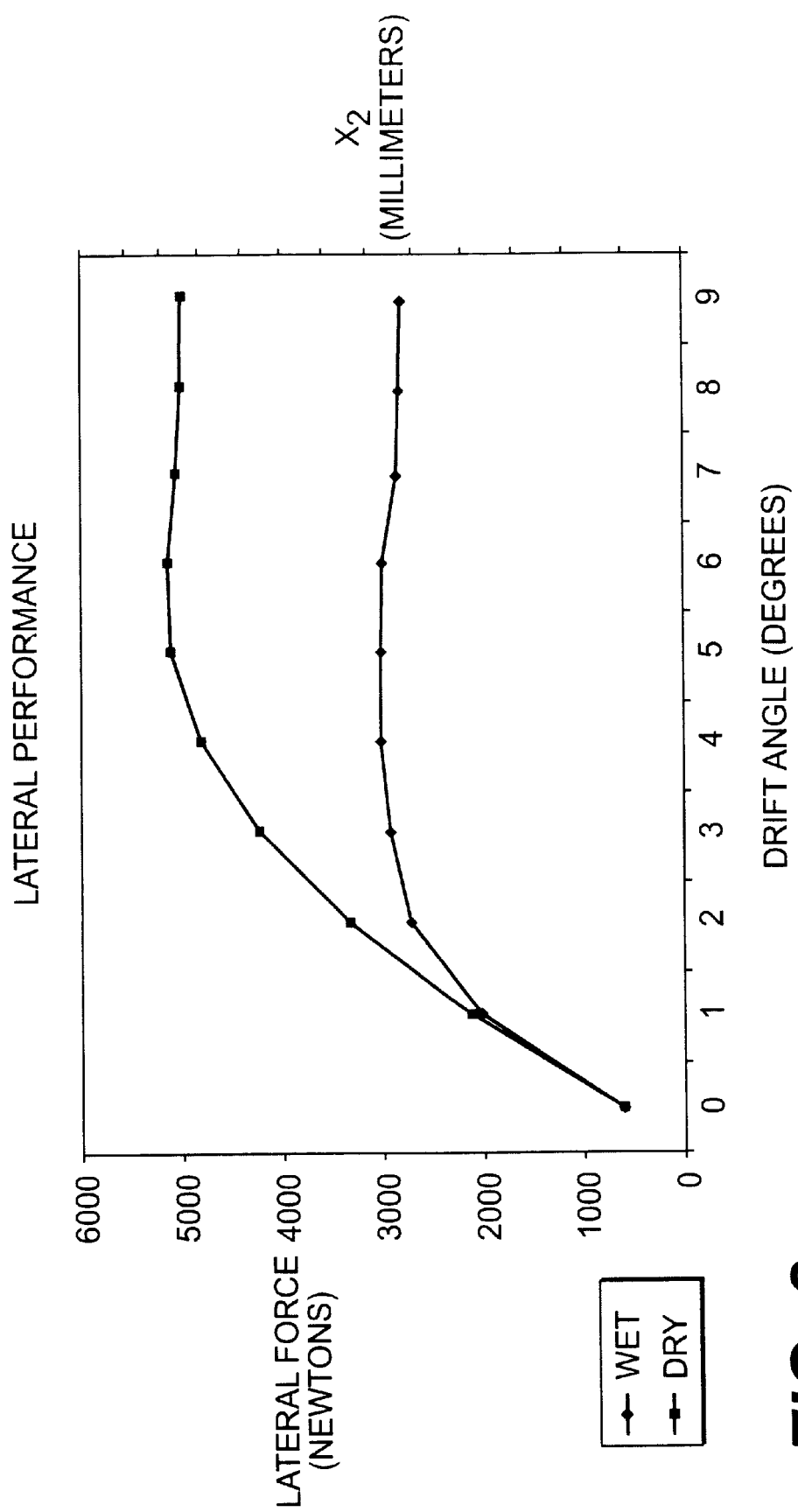
in FIG. 8, a graph of the lateral force developed by, or exerted on, a tyre in dry and wet road conditions as a function of the angle of drift.

The measurement of $X_2$ provides an indication of the behaviour of the tyre in cornering. The lateral force exerted by each tyre on the ground is directly dependent on its deformed configuration, in other words on $X_2$. When the angle of drift exceeds a critical value, the tyre starts to skid laterally, with a decrease of the lateral force exchanged with the ground, as shown in FIG. 8. This skid can be detected from the decrease of $X_2$.

The measurement of $X_3$ provides an indication of the possibility of the tyre's skidding or spinning on the ground in the longitudinal direction. This is because, during braking or acceleration, $X_3$ increases with an increase of the braking or driving torque that is exerted on the tyre.

A decrease of $X_3$ may signify that the tyre has started to skid or spin in the longitudinal direction on the ground.

This skidding or spinning implies a loss of adhesion and, therefore, a smaller force transmitted to the ground and a corresponding modification of the deformed configuration of the casing in the direction of return to the equilibrium profile, with a consequent decrease of $X_3$.

During braking, this may mean that the tyre in question is no longer providing the correct ground adhesion, thus allowing the vehicle to skid or the wheel to spin. During acceleration, this decrease of $X_3$ may signify that one or more of the driving wheels is slipping, causing what is known as the "skidding" or "spinning" of the wheels of the vehicle.

According to another aspect of the present invention, these parameters are measured inside the tyre by means of appropriate sensors. For example, as shown if FIG. 2, in a preferred embodiment, a sensor/emitter 11 (termed a "sensor" for brevity in the following text) is placed within the supporting rim 2, being inserted in the wall of the said rim along the midline plane.

A passive element, for example a reflecting element 12, that interacts with the sensor 11 in the determination of $X_1$, $X_2$ and $X_3$, may be inserted inside the tyre, particularly on its inner surface, in contact with the "liner" and on the equatorial plane of the tyre.

This is because the distance $X_1$ is equal to the distance between the reflecting element 12 and the sensor 11 in the direction of the rolling radius of the tyre, the distance $X_2$ is equal to the distance between the reflecting element 12 and the sensor 11 in the transverse direction, and the distance $X_3$ is equal to the distance between the reflecting element 12 and the sensor 11 in the direction D.

To measure these distances, the sensor 11 emits a signal which is reflected by the reflecting element 12 with an intensity varying according to its position with respect to the sensor. The reflection time of the signal can be measured in combination with or as an alternative to the measurement of the intensity. The reflected signal received by the sensor is appropriately encoded according to the angle of reflection and/or the differences of intensity and/or of reflection time from predetermined values, in such a way as to determine the value of $X_1$, $X_2$ and $X_3$.

In the embodiment described above, the sensor comprises both the emitting element and the receiving element of the reflected signal. It is to be understood that the two functions can be carried out by two independent elements separated from each other, or by a single element which combines them, according to the specific technology used.

Figure 5:
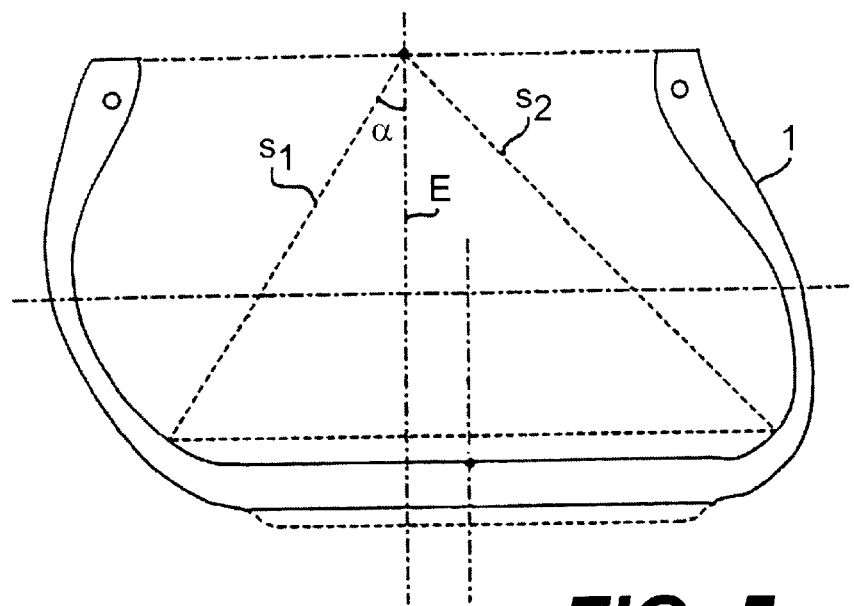
in FIG. 5, a transverse section through a tyre fitted on its supporting rim in conditions of lateral drift, showing a system of measuring the deformations according to the invention.

A different method of measuring $X_2$ is, for example, that defined as optical triangulation. In other words, the sensor emits (FIG. 5) a pair of signals $s_1$ and $s_2$ in a symmetrical direction with respect to the equatorial plane E towards each of the two sidewalls of the tyre. Preferably, the angle of emission $\alpha$ is in the range from 30° to 60° with respect to the equatorial plane. The differences between the signals reflected from the two sidewalls at the same angle of emission can be used to determine the distances between the sensor and the said sidewalls. The said two distances can be used to find the displacement $X_2$.

Figure 6:
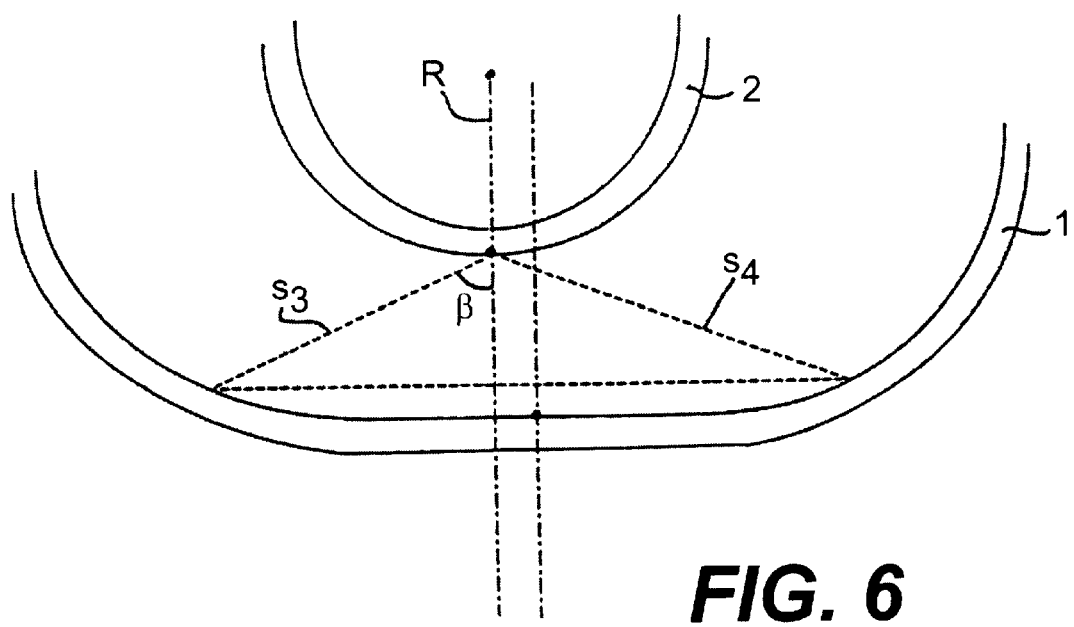
in FIG. 6, a longitudinal section through a tyre fitted on its supporting rim in braking conditions, showing a system of measuring the deformations according to the invention.

Similarly, the same method can be used to measure $X_3$ by sending a pair of signals $s_3$ and $s_4$ which are symmetrical (FIG. 6) with respect to a plane containing the axis of rotation, in the direction of rolling of the tyre, one of the signals being sent in a direction coinciding with the direction of advance of the vehicle, and the other in the opposite direction. Preferably, the angle of emission β is in the range from 10° to 90°, and more preferably from 15° to 80°, with respect to the radial plane R. The differences between the signals reflected from the inner surface of the tyre determine two values of distance that can be used to find the displacement $X_3$.

By way of example, the signal emitted by the sensor 11 may be in the form of sound waves, for example, ultrasound or electromagnetic waves such as light waves, which are reflected from the reflecting element 12 or from the inner surface of the tyre. Reflection obtained from the inner surface of the tyre, in the absence of reflecting elements added to or formed on it, is particularly convenient since it does not require modifications to the structure of the tyre or to its manufacturing process or to the mounting process. Additionally, the condition of total darkness present within the tyre makes the use of signals of the light type particularly convenient.

The reflected signals can advantageously be encoded within the sensor itself.

It is to be understood that the sensor and the reflecting element described above can be replaced in an equivalent way within the scope of the present invention with other types of sensors and reflecting elements capable of measuring the aforesaid parameters.

The sensor may also comprise a plurality of emitters placed circumferentially, preferably in positions equidistant from each other in such a way as to record each $X_1$, $X_2$ and $X_3$ several times during the rotation of the wheel.

According to a different aspect of the present invention, the sensor may, instead of measuring the distance between two points, carry out an integration of different measurements between adjacent points, thus reconstructing the shape of an extended portion of the inner surface of the tyre.

The sensor or the system for measuring the deformed profile of the tyre preferably also comprises a pressure gauge and/or a velocity and/or acceleration meter.

In a preferred, embodiment, the sensor 11 also comprises a device 13 for measuring the angular velocity of the wheel, located, for example, on the hub of the wheel, this device receiving a pulse, electrical or magnetic, for example, on each complete rotation of the wheel. It is thus possible to count the rotations of the wheel within the unit of time and therefore to measure the angular velocity. This information can be deduced, in the absence of the device 13, from the analysis and processing of a signal emitted and recorded by the sensor 11, by the generation of a signal correlated with the said angular velocity.

Within the wheel, and preferably within the casing of the sensor, there is a transmitter capable of sending the data on all the measured characteristic parameters to a receiver operatively connected to a processing unit that is preferably located on the vehicle.

In a preferred embodiment, this transmitter comprises an electronic circuit, supplied from a battery or in any other convenient way, which transmits the data relating to the said parameters by means of electromagnetic waves, preferably at short-wave radio frequency, in a frequency range preferably from 100 kHz to 1000 MHz, and even more preferably in digital form.

This transmitter, installed within each wheel of the motor vehicle, may advantageously comprise both the electronic circuit and the power supply.

Alternatively, according to the invention, the transmitter can be supplied in an intermittent way, for example by inductive coupling with a fixed power source on the vehicle.

To reduce the dimensions to a minimum, the transmitter preferably uses, in a known way, the SMD (Surface Mounting Device) technology of mounting the components, while in order to reduce power consumption to a minimum, electronic components of the CMOS (Complementary Metal-Oxide Semiconductor) type are preferably used.

Typically, this transmitter also comprises a microcontroller which is responsible for the function of controlling the transmitter according to a programmed logic stored within it. The microcontroller processes the received data and sends them to a transmitter circuit that, in turn, transmits it, by means of an antenna, for example.

The transmitter circuit is, for example, a circuit which is frequency stabilized by means of a SAW (Surface Acoustic Wave) resonator at the frequency of 433.92 MHz. It is connected directly to the power source (battery, inductively-charged capacitor, etc.) in such a way that the maximum available voltage can be used. It is capable of supplying a power of approximately 4 mW, with modulation of the ASK (Amplitude Shift Key) type.

According to a further aspect of the present invention, the individual value of the three parameters $X_1$, $X_2$, $X_3$ measured in a specific operating condition are compared with data on the behaviour of the tyre stored in the processor fitted on the vehicle, these data being available for each tyre and for a set of values of inflation pressure and operating conditions of the tyre, having been obtained, for example, from measuring machines in laboratory tests. These data identify the characteristic functions which relate the deformation of the casing structure of the tyre to the force applied, in other words, the performance of the tyre with reference to the flattening under load, defined here as the vertical performance, to the transverse displacement in drifting, defined here as the lateral performance, and to the creeping under torque, defined here as the longitudinal performance of the tyre.

According to this aspect of the invention, the control of the behaviour of a vehicle fitted with pneumatic wheels includes the steps of providing tyre performance data, measuring tyre behaviour data by means of signals emitted within the wheels, comparing the said data with each other, and activating control devices of the vehicle according to the result of the said comparison.

Figure 7:
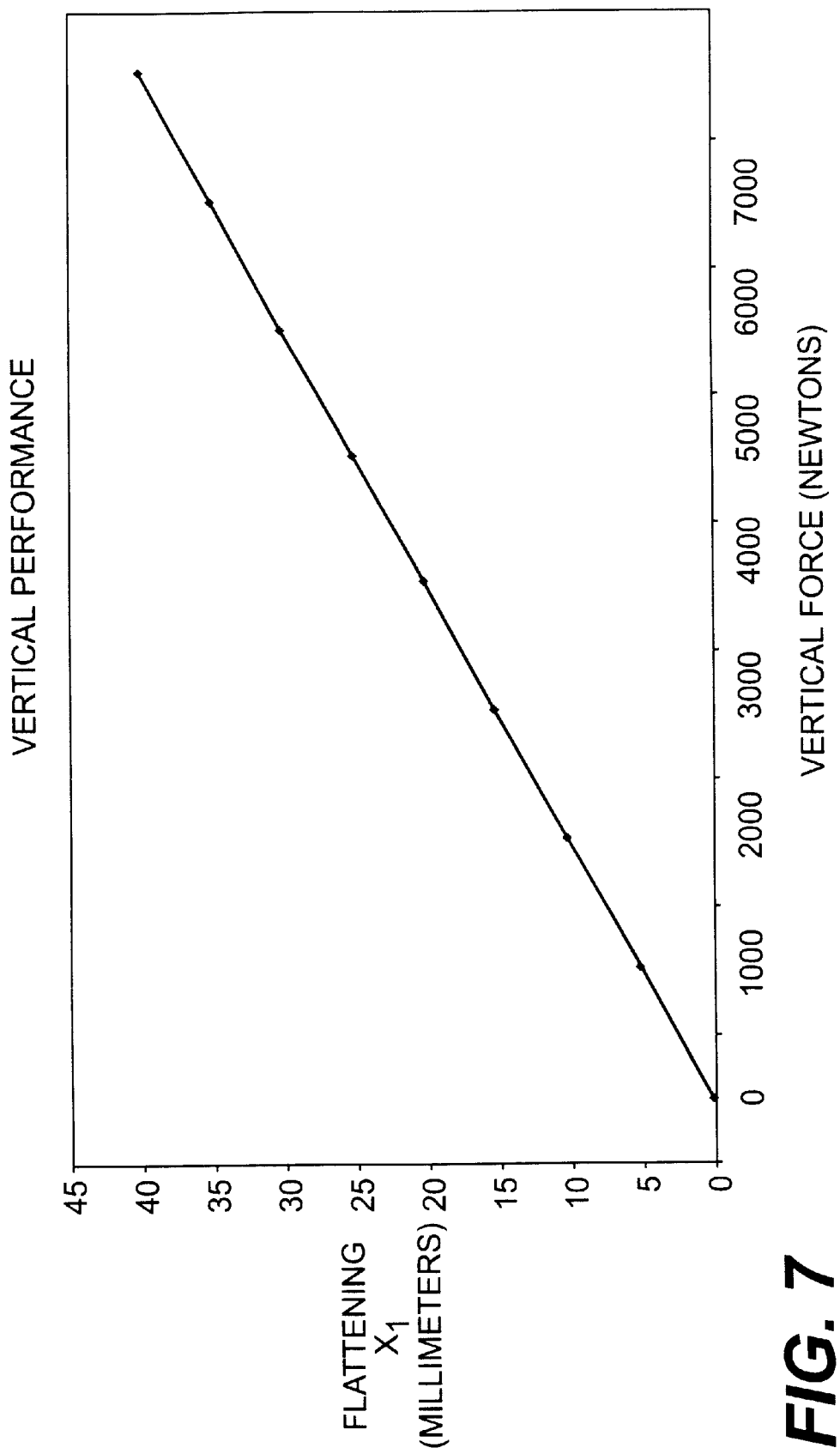
in FIG. 7, a graph representing the flattening of a tyre in static conditions as a function of the vertical force exerted on it.
Figure 9:
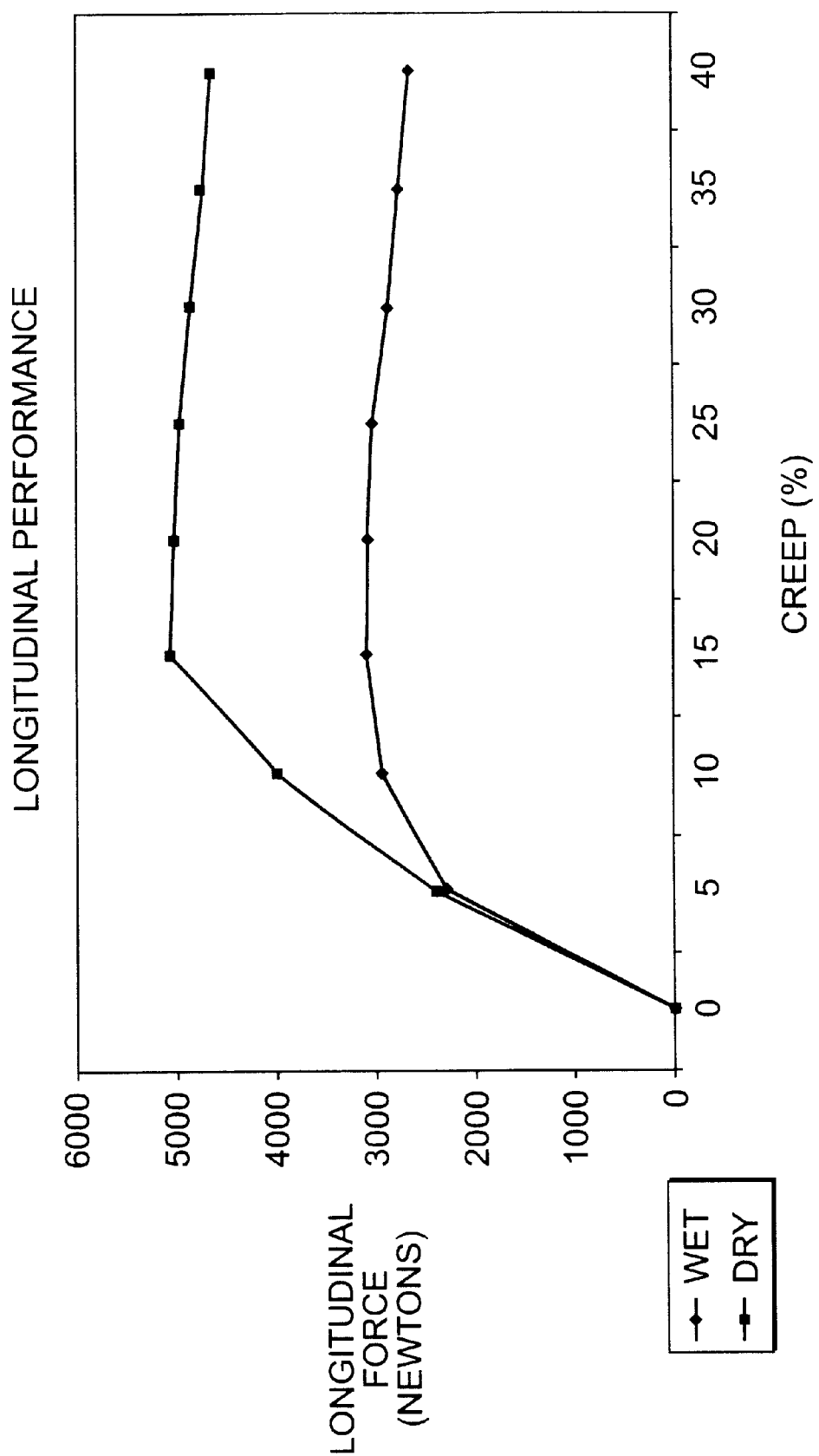
in FIG. 9, a graph of the longitudinal force developed by, or exerted on, a tyre in dry and wet road conditions as a function of the longitudinal creep.

FIGS. 7, 8, and 9 show some examples of performance, obtained in the laboratory by subjecting a tyre, inflated at its nominal operating pressure and placed on a flat belt moved at a speed of 30 kilometres per hour, in both dry and wet conditions, to the corresponding system of forces, in other words the vertical force, lateral force, and longitudinal force.

In particular, FIG. 7 shows a curve of the said vertical performance which relates what is known as the vertical flattening of the tyre to the vertical force exerted on it at the specific pressure value of 2.2 bars.

This curve can be directly related to the dynamic load acting on the tyre in motion, since, when $X_1$ and the value of the inflation pressure are known, it can be used to find the value of the aforesaid load, which is inversely proportional to the distance $X_1$ in FIG. 2.

FIG. 8 shows two curves of lateral performance, which relate the angle of drift of the tyre to the lateral force which the tyre develops during cornering, for dry and wet road conditions.

The curves shown in FIG. 8 relate to a certain value of vertical load and inflation pressure: other similar curves can be plotted for different values of pressure and different vertical loads.

In these graphs, the distance $X_2$ is correlated with the applied lateral force, since when the lateral force increases the distance $X_2$ increases correspondingly.

The graph shows, in a typical way, a first rising portion in which the lateral force increases considerably with an increase in the angle of drift, and a second portion in which the lateral force no longer rises, in spite of the increase in the angle of drift. In some cases, the lateral force actually decreases, particularly on roads with poor adhesion, for example, a wet road.

This signifies that, beyond a certain limit, even if the driver increases the steering angle of the wheels, and consequently the angle of drift of the vehicle, the lateral force no longer increases. Consequently, the friction of the tyre on the ground is not increased, thus producing, for the tyres fitted on the front axle, the situation commonly called "understeering".

The Applicant has discovered that, by measuring the distance $X_2$, which is correlated with the value of the lateral force, and the inflation pressure of the tyre is known, then for a certain vertical load on the wheel known from the measurement of $X_1$, by means of the graph in FIG. 8 it is possible to know when the tyre reaches the maximum possible adhesion on the road surface, even without knowing in advance the coefficient of friction between the tyre and the road surface.

When the data for all the tyres of the vehicle are available, therefore, it is possible to determine whether the roadhandling at the moment in question is optimal or whether the vehicle is about to skid laterally.

FIG. 9 shows two curves of longitudinal performance, which relate the longitudinal force exerted on the tyre to the percentage creep of the tyre with respect to the ground during a phase of acceleration or braking.

In a similar way to FIG. 8, the curves shown represent the force which the tyre may develop in dry and wet conditions respectively. Further curves can be plotted for different values of vertical load and operating pressure of the tyre.

In these curves it can be seen that, in a first portion of the curve, the longitudinal force increases progressively to a maximum value as the creep increases. After this value, the creep increases without a further increase in the longitudinal force. On the contrary, the applied force decreases. This signifies that beyond this value the tyre can no longer be sure of holding the road and starts to skid or spin.

The measured distance $X_3$ can be related to the creep, since the deformability of the casing structure of the tyre allows torsion of the crown of the tyre about the axis of rotation. When the maximum torsion has been exceeded, the tyre starts to skid or spin on the ground. Consequently, in conditions of sharp acceleration and during hard braking, when the torsion is maximum, $X_3$ will tend to increase until the tyre spins or skids on the ground. From this instant onwards, the value of $X_3$ will start to fall sharply, indicating that the tyre is spinning or skidding.

It is therefore possible to know whether the tyre in question is close to spinning or skidding, by monitoring the value of $X_3$ in acceleration and braking for a certain period of time, and comparing it with the corresponding data on longitudinal performance. In particular, if a creep of the order of 5% or less is found by monitoring $X_3$, this confirms that the tyre is operating with a good degree of longitudinal adhesion.

According to the invention, the determination of the three parameters $X_1$, $X_2$, $X_3$ and their comparison with the corresponding performance data not only provides an indication of the state of stress of each tyre in a given operating situation, but also makes it possible to predict the variation of its behaviour in the said operating situation. It thus becomes possible to act on the vehicle driving and/or control system to optimize the vehicle's behaviour.

Figure 12:
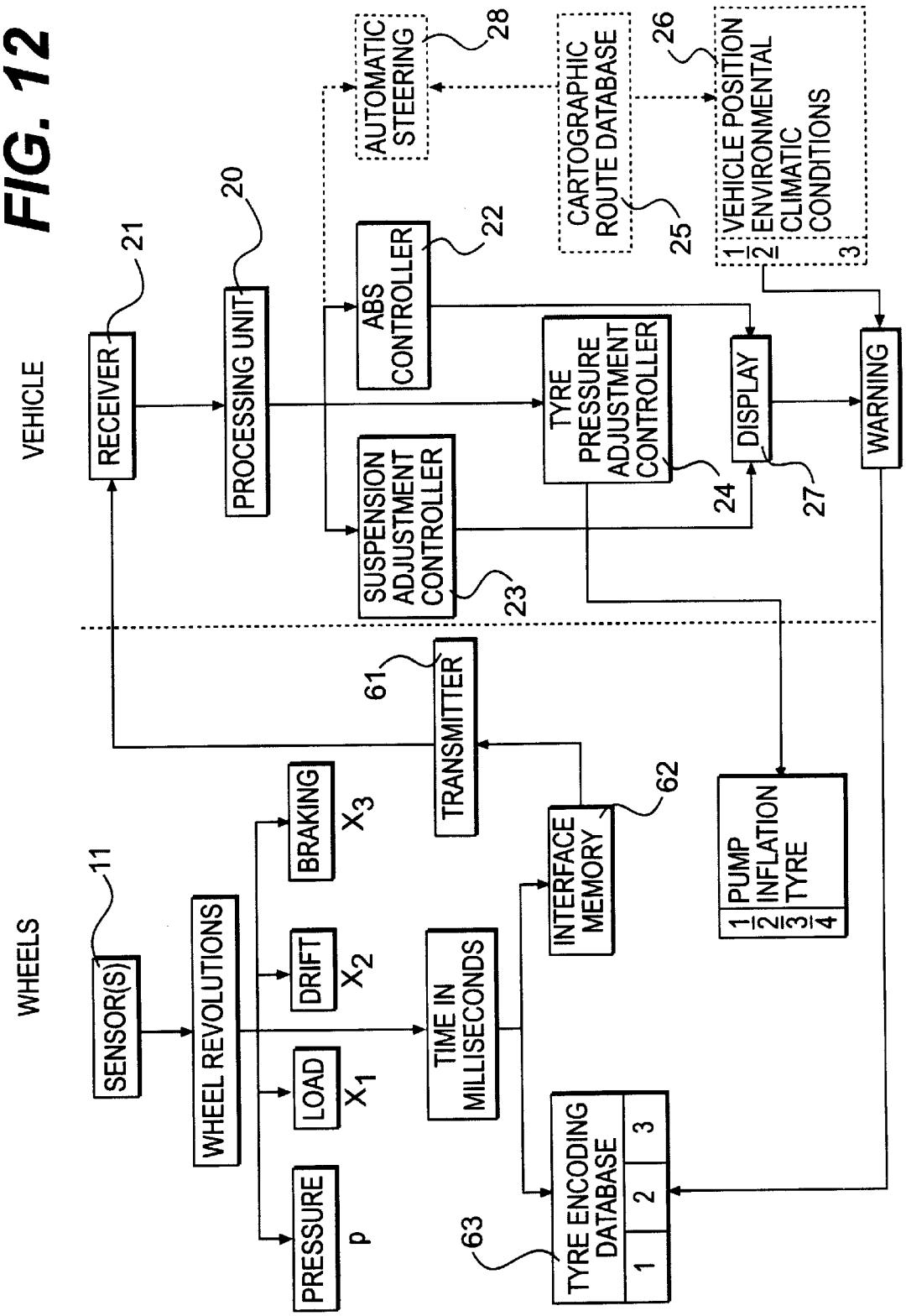
in FIG. 12, a block diagram of the tyre monitoring and vehicle-control system; and in FIG. 13, a flow chart of an example of an action taken by the control system.

Additionally, according to the invention, the processing unit is capable of controlling all the devices which determine the correct motion of the vehicle, particularly the devices for regulating the mechanisms controlling the behaviour, including attitude, of the said vehicle. These devices (FIG. 12) include, for example, a controller of the anti-lock braking system (ABS) 22, a suspension-adjustment controller 23, a controller for correcting the inflation pressure of the tyres 24, and a vehicle stability controller (ESP, "Electronic Stability Program", system) (not shown in the figure).

The processing unit is also capable of controlling the fuel supply controller, for example the electronic injection in vehicles in which this is present, in such a way as to act on the power supplied by the engine and transmitted to the driving wheels.

In a preferred embodiment of the invention, the monitoring and control system described above operates in the following way:

For each tyre fitted on the vehicle, the sensor 11 measures for each rotation, or several times within a single rotation, the aforesaid parameters $X_1$, $X_2$ and $X_3$, and sends them, by means of the transmitter 61 and the receiver 21, to the processing unit 20. The said transmitter also sends to the processing unit the value of pressure p and the rotation velocity g of each individual tyre. The transmitter transmits these data in a predetermined format such that they can easily be decoded by the receiver 21.

The processing unit 20 has available in the store 63 the encoding database of each tyre whose data are represented, for example, by the curves in FIGS. 7, 8, and 9.

Whenever the parameters are received, this unit can compare the measured parameters with the corresponding values contained in the database.

For each tyre, therefore, the parameters $X_1$, $X_2$ and $X_3$ are compared continuously with these curves to verify that the condition of motion of the vehicle is optimal. If one or more of the parameters deviates by a predetermined amount from the optimal value, the processing unit can generate an alarm signal visible to the user by means of a display 27 located, for example, on the dashboard of the vehicle. Advantageously, an arrangement can be made to generate a typical signal for each anomalous event occurring. For example, the alarm signal which identifies the lateral skid in cornering may be different from the alarm signal which identifies the condition of a deflated tyre.

According to the conditions thus identified and/or the type of alarm signal, the processing unit can act, possibly in an automatic way, on the appropriate controller to correct the behaviour of the vehicle.

Figure 13:
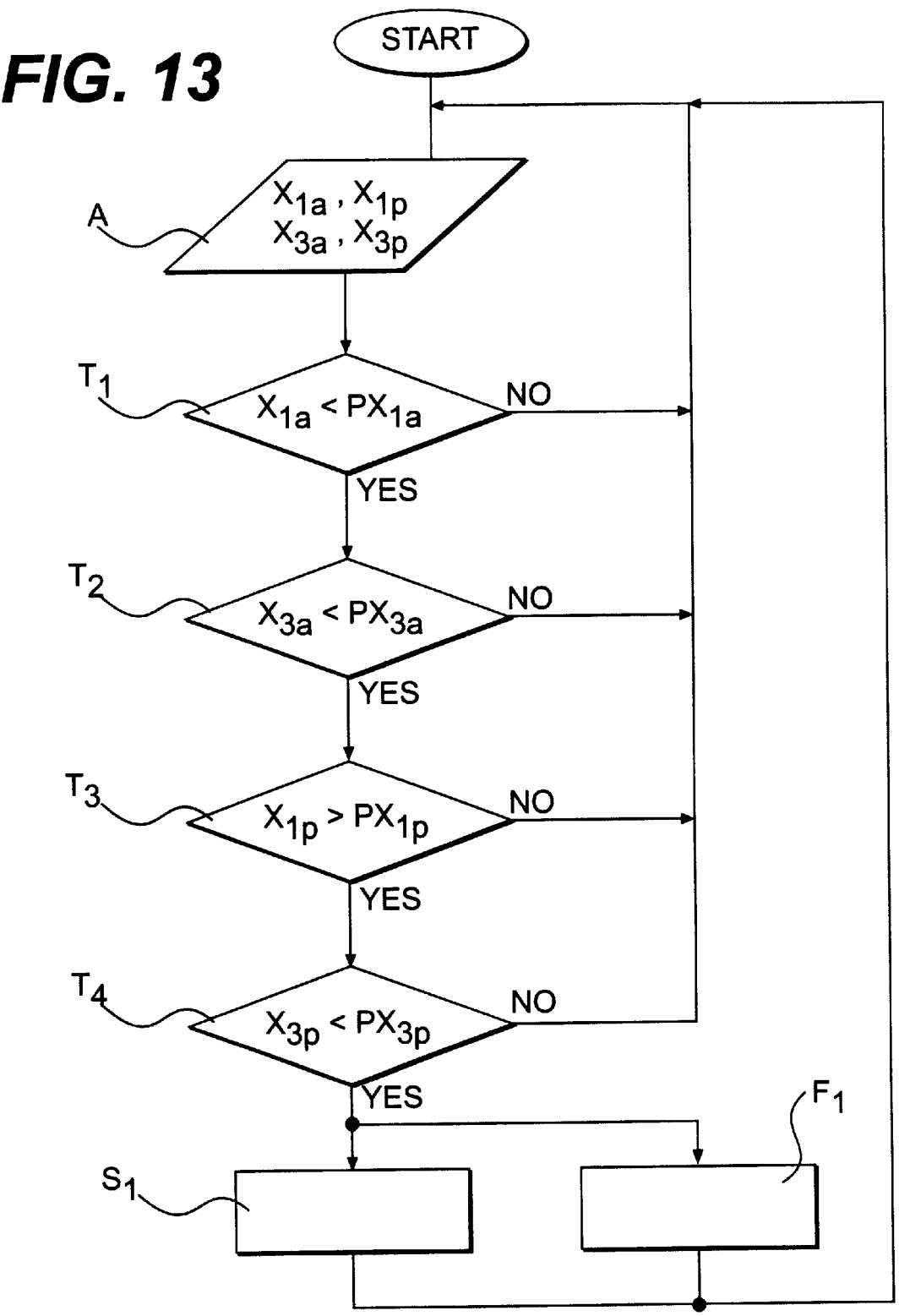

FIG. 13 shows an example of the way in which the vehicle control system according to the invention can operate.

It is assumed that the aim is to control the behaviour of a vehicle with a forward-mounted engine and drive system, provided with an active suspension system and a system for distributing the braking among the four wheels, during a braking operation carried out in conditions of travel in a straight line on dry ground.

In order to facilitate the understanding of the example, the flow chart shown here takes into consideration only the control of the braking, disregarding all other parallel control operations which may be executed for overall control of the vehicle's behaviour.

During braking, some of the load is transferred to the front axle of the vehicle and consequently to the two front tyres. The aforesaid control operation is described only for one tyre of each axle since, in the case of motion in a straight line, it is assumed that the pair of tyres' on the same axle behave in an identical way.

In the case considered by way of example, the measured distance $X_{1a}$ (flattening of the front tyre) decreases, while the measured distance $X_{1p}$ (flattening of the rear tyre) increases as a result of the said load transfer.

The braking also generates a longitudinal creep; the front tyres, subject to a greater load, show an increase in the distance $X_{3a}$ (front axle tyre creep) and the rear tyres show a decrease in the distance $X_{3p}$ (rear axle tyre creep).

These measured values are compared with predetermined reference values stored in the aforesaid database and selected from the database, such as those shown in FIGS. 7, 8, and 9.

The data contained in the database are, for this type of control, $PX_{1a}$, $PX_{1p}$, $PX_{3a}$, $PX_{3p}$, where, for the aforesaid road surface conditions, $PX_{1a}$ represents the maximum distance $X_1$ acceptable for a tyre on the front axle, $PX_{1p}$ represents the minimum distance $X_1$ acceptable for a tyre on the rear axle, $PX_{3a}$ represents the maximum creep $X_3$ acceptable for a tyre before the start of longitudinal skidding on the front axle, and $PX_{3p}$ represents the minimum creep $X_3$ acceptable in the condition in which the wheel is in motion.

It should be noted that these reference values may be selected in different ways, for example in accordance with a more comfortable driving program (with reference values permitting smaller deformations of the tyre) or a more sporty program (with reference values permitting larger deformations of the tyre).

FIG. 13 shows a flow chart providing an example of the way in which the control system operates.

In this flow chart, the following steps are shown:

step A: measurement of the values $X_{1a}$, $X_{3a}$, $X_{1p}$ and $X_{3p}$;

step $T_1$: comparison of $X_{1a}$ with the reference value $PX_{1a}$ to determine whether the load on a tyre of the front axle exceeds the maximum permissible reference value;

step $T_2$: comparison of $X_{3a}$ with the reference value $PX_{3a}$ to determine whether the creep in a tyre of the front axle is greater than the maximum permissible reference value of the creep;

step $T_3$: comparison of $X_{1p}$ with the reference value $PX_{1p}$ to determine whether the load on a tyre of the rear axle is less than the minimum permissible reference value;

step $T_4$: comparison of $X_{3p}$ with the reference value $PX_{1p}$ to determine whether the load on a tyre on the rear axle is less than the minimum permissible reference value;

step $S_1$: action on the processing unit of the active suspension system to cause a stiffening of the front suspension;

step $F_1$: action on the processing unit of the system for distributing the braking over the four wheels to provide braking modulation by applying a greater load to the front wheels and correspondingly lightening the load on the rear wheels.

After the acquisition of the data on $X_1$ and $X_3$, the comparisons determine whether the system has to intervene to correct the behaviour of the vehicle. The flow chart shows that, if the answer is affirmative, the system determines, in all the comparisons $T_1$, $T_2$, $T_3$, and $T_4$, a condition of excessive braking action with a tendency to probable loss of adhesion of the wheels and consequent skidding of the vehicle. If at least one of the parameters conforms to the standard, in other words does not exceed the corresponding reference value, the system repeats the data acquisition for another comparison. This condition identifies a different behaviour of the vehicle that might require different action by the processing unit.

In the aforesaid case of an affirmative answer, the system acts on the front suspension (action $S_1$) and on the braking system (action $F_1$) until the values measured in the tyres are returned to a condition corresponding to the predetermined behaviour of the vehicle.

A further example of control relates to cornering in extreme conditions. With reference to a car with a forward-mounted engine and drive system, the tyre subject to the greatest load is the front tyre on the outside of the corner. The processing unit monitors this condition, typically measuring a significant decrease of $X_1$ and increase of $X_2$ in the front tyre on the outside of the corner, a moderate increase of $X_2$ and decrease of $X_1$ in the rear tyre on the outside of the corner, and a moderate increase of $X_2$ and $X_1$ in the rear tyre on the inside of the corner which may sometimes even be lifted off the ground.

A correct action in these conditions is, for example, to stiffen the front suspension on the outside of the corner, in such a way as to limit the rolling of the vehicle body and the characteristic variations of angles of the wheels associated with this, and to distribute the braking so that the brakes are applied more heavily on the tyres which are subject to greater loads (corresponding to a smaller $X_1$) and, therefore, have greater friction on the ground.

A vehicle which has a suspension with variable adjustment, particularly active suspension with independent control for each wheel, will make the best use of the invention, since the adjustment of the suspension can be related to each individual tyre.

An example of an active suspension suitable for the purposes of the present invention is described in the previously cited U.S. Pat. No. 5,087,072.

Another active suspension control system suitable for the purpose is the system called ABC (Active Body Control) provided on a vehicle made by the motor manufacturer Mercedes. This system requires the use of suspension whose adjustment is regulated by a hydraulic system controlled by an electronic system. The electronic system is provided with information on the dynamic behaviour of the car by a set of sensors, particularly by accelerometers located on the vehicle. The action on the suspension is very fast and makes it possible to correct roll that affects the vehicle during cornering.

According to the present invention, all these systems, if made capable of receiving information and data directly from the tyre, can correct the attitude of the vehicle by means of the suspension in a much more efficient way than a system which receives the data from accelerometers located on the vehicle.

For example, in respect of the limit of stability, the variation in time of the values measured directly from the tyre can be used to predict precisely the instant at which the tyre will start to spin or skid.

Naturally, other actions may be taken on other control devices, together with or as an alternative to the actions on the suspension. For example, a further corrective action may be that of decreasing the speed of the vehicle by acting on the traction controller that generally applies action to the engine and/or to the braking system.

To demonstrate the correlation between the deformations of the tyre casing and the corresponding forces developed by the said tyre, three tables relating the values of the parameters $X_1$, $X_2$ and $X_3$ to the corresponding forces are provided below.

These tables show the measurements made on a newly produced P6000 tyre (size 195/65R15) produced by the present Applicant, inflated to a pressure of 2.2 bars, subjected to a set of tests on a laboratory machine (indoor tests). The test machine (road wheel) consists of a cylindrical drum with a diameter of 1700 mm which can be rotated at different speeds. The radially-external surface of the aforesaid drum can be covered with a strip of suitable material having different characteristics, to simulate different conditions of the road surface and of the corresponding coefficient of friction.

Figure 10:
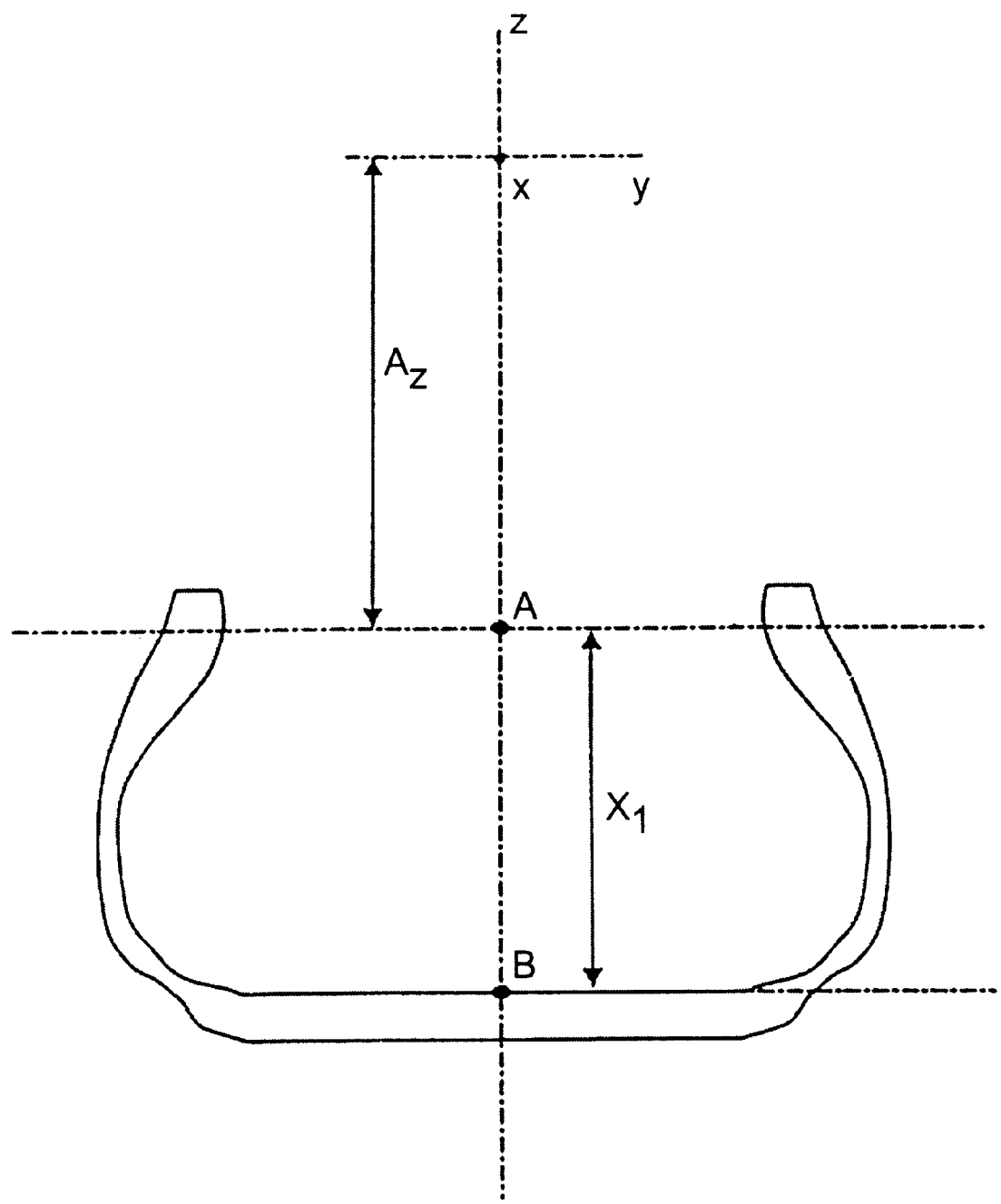
in FIG. 10, the cross-section in a radial plane of a pneumatic wheel, showing the system of Cartesian coordinates used to plot graphs corresponding to those in FIGS. 7, 8 and 9 according to the invention.

The values of the parameters $X_1$, $X_2$, and $X_3$ shown in the table are related to a system of Cartesian coordinates (x, y, z) having its origin at the centre of rotation of the tyre, as shown in FIG. 10. The sensor 11 (point A) is located on the rim on its midline plane, at the coordinates (0, 0, 200), and the point of reflection B is located in the same radial plane as the sensor 11, on the equatorial plane of the tyre. Thus, the values of the parameters $X_1$, $X_2$ and $X_3$ shown in the tables correspond to the actual distance of point B from point A in the appropriate coordinate direction. Table 1 shows the value of the flattening $X_1$ with the variation of the vertical force (load) for the aforesaid tyre in operation at a speed of 30 km/hr with angles of drift and camber equal to 0°. The tyre was made to roll against the road wheel by applying a load increasing from 250 kg to 450 kg.

TABLE 1

| Load (kg) | $X_1$(mm) |
| --- | --- |
| 250 | 89.9 |
| 300 | 87.3 |
| 350 | 84.8 |
| 400 | 82.1 |
| 450 | 79.4 |

The results shown in the table confirm the trend of the graph in FIG. 7 plotted by using a different apparatus, in other words, the aforesaid flat belt, in the significant range of values for the vertical load.

Table 2 shows the value of $X_2$ and the lateral force (drift force) developed by the tyre which travels at a speed of 30 km/hr with an angle of drift variable between 0° and 6° for successive increments of 0.6°. The test machine is the same as that used for the preceding test, having the facility for setting an angle of drift for the tyre, as well as a suitable dynamometer hub for measuring the force and torque. The test was conducted with a constant load of 350 kg and with an angle of camber equal to 0°.

TABLE 2

| Drift (°) | $X_2$ | Drift Force (kg) |
| --- | --- | --- |
| 0 | 0.4742 | 6.9 |
| 0.6 | 3.767 | 55.5 |
| 1.2 | 6.852 | 101.3 |
| 1.8 | 9.096 | 135.0 |
| 2.4 | 10.43 | 154.9 |
| 3 | 11.33 | 168.7 |
| 3.6 | 11.98 | 178.6 |
| 4.2 | 12.44 | 185.6 |
| 4.8 | 12.76 | 190.4 |
| 5.4 | 12.97 | 193.8 |
| 6 | 13.12 | 196.0 |

The values in the table confirm the trend of the graph in FIG. 8 relating to the curve for a dry road.

In this table it may be seen that, when the angle of drift increases, the point A is displaced significantly in the transverse direction to the outside of the corner (increase of $X_2$). At the same time, the tyre generates a lateral force that increases as a function of the deformation of its casing profile.

Table 3 shows the value of the creep $X_3$ with the variation of the longitudinal force applied to the axis of rotation of the aforesaid tyre under a load of 350 kg in operation at a speed of 30 km/hr with angles of drift and camber equal to 0°.

TABLE 3

| Force (kg) | Force (N) | Creep (%) | $X_3$(mm) |
| --- | --- | --- | --- |
| 300 | 2,945 | 2 | 2.5 |
| 380 | 3,707 | 3 | 3.5 |
| 420 | 4,121 | 4 | 5 |
| 460 | 4,464 | 9 | 8 |
| 450 | 4,420 | 11 | 9.8 |

The values in Table 3 also confirm the trend of in the graph in FIG. 9 in relation to the curve for a dry road.

The present invention has been described with particular reference to a four-wheeled vehicle. The invention is also equally applicable to two-wheeled vehicles and to any type of vehicle fitted with rubber-tyred wheels when the corresponding databases and corresponding vehicle control functions are provided.

It should be noted that the combination among the measurements of deformations of the casing along different axes, in combination with the condition of behavior, including the attitude, of the vehicle in various operating situations, for example in drifting, which can be measured by suitable accelerometers located on the vehicle, makes it possible to calculate the value of further parameters, for example the coefficient of friction, and consequently to select the predetermined reference values for the comparison.

According to the present invention, the same tests can be conducted on-tyres in various conditions of wear, pressure and rotation velocity. In the same way, it is possible to conduct combined tests in the presence of drift and torque. All of this data can be stored in the aforesaid database on the vehicle and used in the most appropriate conditions.

It thus becomes possible to monitor and control multiple events.

For example, it is possible to decide whether to modify the pressure of the tyres by acting on the corresponding controller for correcting the pressure, for example, where it is necessary to travel over a snow-covered stretch of road, in order to increase the traction capability of the tyres.

The processing unit may also advantageously communicate with a cartographic database 25 containing data concerning the routes to be travelled and an environmental database 26 into which the geographic location of the vehicle and the climatic conditions of the area in which it is located are input in real time.

It is therefore possible to transmit to the processing unit in real time data on the type of road surface, on the climate, dry or wet conditions, and, in general, the degree of adhesion of the road surface.

Preferably, according to the invention, the system provides for the automatic calibration of all the sensors of the vehicle to provide what is known as a "zero" condition to which all the various measured quantities are related. This condition is preferably that of the vehicle in conditions of operation at a uniform speed close to 0 km/hr, in the presence of a system of forces just sufficient to overcome the resistance to the movement of the vehicle (kinematic condition).

Even more preferably, this zero-point setting is repeated a number of times during the life of the tyre as the state of wear of the tyre progresses.

A set of resident programs for the desired type of driving can also be provided within the processing unit. For example, the comfortable driving program will prevent cornering at the limit of skid of the tyre, by setting the values of the parameters to be compared with the measured ones in a very restrictive way. A possible sporty driving program would be able to give the driver more independence by comparing the measured values with broader reference values.

What is claimed is:

1. A method for monitoring behavior of a vehicle including at least one wheel, comprising:
    determining one or more values of deformation of a tyre of the at least one wheel by measuring the one or more values using a first signal emitted between a rim of the at least one wheel and a casing of the tyre;
    providing a database comprising predetermined values of deformation of the tyre that correspond to a behavior of the at least one wheel;
    comparing the measured one or more values of deformation with one or more of the predetermined values of deformation; and
    emitting a second signal dependent on at least one result of the comparison for monitoring the behavior of the vehicle;
    wherein the one or more values of deformation are determined in vertical, transverse, and longitudinal directions.

2. The method of claim 1, wherein the second signal is an alarm signal.

3. The method of claim 1, further comprising measuring a rotational velocity of the tyre.

4. The method of claim 1, further comprising measuring an inflation pressure of the tyre.

5. The method of claim 1, wherein a unit for measuring the one or more values comprises at least one sensor disposed in or on the rim of the at least one wheel.

6. The method of claim 1, wherein a unit for measuring the one or more values comprises a reflecting element disposed on an inner surface of the tyre.

7. A method for controlling behavior of a vehicle including at least one wheel, comprising:
    determining one or more values of deformation of a tyre of the at least one wheel by measuring the one or more values using a first signal emitted between a rim of the at least one wheel and a casing of the tyre;
    providing a database comprising predetermined values of deformation of the tyre that correspond to a behavior of the at least one wheel;
    comparing the measured one or more values of deformation with one or more of the predetermined values of deformation; and
    emitting a second signal dependent on at least one result of the comparison for controlling the behavior of the vehicle;
    wherein the one or more values of deformation are determined in vertical, transverse, and longitudinal directions.

8. The method of claim 7, wherein the second signal is an alarm signal.

9. The method of claim 7, wherein the second signal is a signal for controlling a mechanism controlling an attitude of the vehicle to keep the behavior of the vehicle within the limits of a predetermined behavior or to bring the behavior of the vehicle back within the limits of the predetermined behavior.

10. The method of claim 9, wherein the second signal acts on a device regulating the control mechanism.

11. The method of claim 7, further comprising measuring a rotational velocity of the tyre.

12. The method of claim 7, further comprising measuring an inflation pressure of the tyre.

13. The method of claim 7, wherein a unit for measuring the one or more values comprises at least one sensor disposed in or on the rim of the at least one wheel.

14. The method of claim 7, wherein a unit for measuring the one or more values comprises a reflecting element disposed on an inner surface of the tyre.

15. A method for monitoring behavior of a vehicle including at least one wheel, comprising:
    determining one or more values of deformation of a tyre of the at least one wheel by measuring the one or more values using a first signal emitted between a rim of the at least one wheel and a casing of the tyre;
    providing a database comprising predetermined values of deformation of the tyre that correspond to a behavior of the at least one wheel;
    comparing the measured one or more values of deformation with one or more of the predetermined values of deformation; and
    emitting a second signal dependent on at least one result of the comparison for monitoring the behavior of the vehicle;
    wherein the one or more values of deformation are determined along the axes of a three-dimensional Cartesian coordinate system.

16. A method for controlling behavior of a vehicle including at least one wheel, comprising:
    determining one or more values of deformation of a tyre of the at least one wheel by measuring the one or more values using a first signal emitted between a rim of the at least one wheel and a casing of the tyre;
    providing a database comprising predetermined values of deformation of the tyre that correspond to a behavior of the at least one wheel;
    comparing the measured one or more values of deformation with one or more of the predetermined values of deformation; and
    emitting a second signal dependent on at least one result of the comparison for controlling the behavior of the vehicle;
    wherein the one or more values of deformation are determined along the axes of a three-dimensional Cartesian coordinate system.

17. A method for controlling behavior of a vehicle in motion, comprising:
    measuring one or more values of casing-profile deformation of at least one tyre of the vehicle at an inflation pressure;
    comparing the one or more values of casing-profile deformation with one or more stored values representing behavior of the tyre in a measured state of deformation; and
    generating a signal for acting on one or more devices regulating at least one mechanism for controlling a behavior of the vehicle in motion;
    wherein the signal corresponds to an action to be taken on the at least one mechanism to keep the behavior of the vehicle within limits of a predetermined behavior of the vehicle or to bring the behavior back within the limits of the predetermined behavior, and
    wherein the one or more values of casing-profile deformation are measured in vertical, transverse, and longitudinal directions.

18. The method of claim 17, wherein the signal is an alarm signal.

19. The method of claim 17, wherein the signal acts on a device regulating the at least one mechanism.

20. The method of claim 17, further comprising measuring a rotational velocity of the at least one tyre.

21. The method of claim 17, further comprising measuring an inflation pressure of the at least one tyre.

22. The method of claim 17, wherein a unit for measuring the one or more values comprises at least one sensor disposed in or on a rim of the at least one tyre.

23. The method of claim 17, wherein a unit for measuring the one or more values comprises a reflecting element disposed on an inner surface of the at least one tyre.

24. A method for controlling behavior of a vehicle in motion, comprising:

measuring one or more values of casing-profile deformation of at least one tyre of the vehicle at an inflation pressure;

comparing the one or more values of casing-profile deformation with one or more stored values representing behavior of the tyre in a measured state of deformation; and generating a signal for acting on one or more devices regulating at least one mechanism for controlling a behavior of the vehicle in motion;

wherein the signal corresponds to an action to be taken on the at least one mechanism to keep the behavior of the vehicle within limits of a predetermined behavior of the vehicle or to bring the behavior back within the limits of the predetermined behavior, and wherein the one or more values of casing-profile deformation are measured along the axes of a three-dimensional Cartesian coordinate system.

25. A system for monitoring behavior of a vehicle in motion, comprising:

at least one unit for measuring one or more values of casing-profile deformation of at least one tyre of the vehicle;

a database comprising one or more predetermined values of deformation that represent behavior of the at least one tyre in a measured state of deformation; and a data processing unit receiving communications from the at least one unit for measuring;

wherein the data processing unit compares the one or more values of casing-profile deformation with the one or more predetermined values, wherein the data processing unit emits a signal used for monitoring the behavior of the vehicle, and wherein the one or more values of casing-profile deformation are measured in vertical, transverse, and longitudinal directions.

26. The system of claim 25, wherein the signal is an alarm signal.

27. The system of claim 25, wherein the at least one unit for measuring also measures a rotational velocity of the tyre.

28. The system of claim 25, wherein the at least one unit for measuring also measures an inflation pressure of the tyre.

29. The system of claim 25, wherein the at least one unit for measuring comprises at least one sensor disposed in or on a rim of the at least one tyre.

30. The system of claim 25, wherein the at least one unit for measuring comprises a reflecting element disposed on an inner surface of the at least one tyre.

31. A system for controlling behavior of a vehicle in motion, comprising:

at least one unit for measuring one or more values of casing-profile deformation of at least one tyre of the vehicle;

a database comprising one or more predetermined values of deformation that represent behavior of the at least one tyre in a measured state of deformation; and a data processing unit receiving communications from the at least one unit for measuring;

wherein the data processing unit compares the one or more values of casing-profile deformation with the one or more predetermined values, wherein the data processing unit emits a signal used for controlling the behavior of the vehicle, and wherein the one or more values of casing-profile deformation are measured in vertical, transverse, and longitudinal directions.

32. The system of claim 31, wherein the signal is an alarm signal.

33. The system of claim 31, wherein the signal is a signal for controlling a mechanism controlling an attitude of the vehicle to keep the behavior of the vehicle within the limits of a predetermined behavior or to bring the behavior of the vehicle back within the limits of the predetermined behavior.

34. The system of claim 33, wherein the signal acts on a device regulating the control mechanism.

35. The system of claim 31, wherein the at least one unit for measuring also measures a rotational velocity of the tyre.

36. The system of claim 31, wherein the at least one unit for measuring also measures an inflation pressure of the tyre.

37. The system of claim 31, wherein the at least one unit for measuring comprises at least one sensor disposed in or on a rim of the at least one tyre.

38. The system of claim 31, wherein the at least one unit for measuring comprises a reflecting element disposed on an inner surface of the at least one tyre.

39. A system for monitoring behavior of a vehicle in motion, comprising:

at least one unit for measuring one or more values of casing-profile deformation of at least one tyre of the vehicle;

a database comprising one or more predetermined values of deformation that represent behavior of the at least one tyre in a measured state of deformation; and a data processing unit receiving communications from the at least one unit for measuring;

wherein the data processing unit compares the one or more values of casing-profile deformation with the one or more predetermined values, wherein the data processing unit emits a signal used for monitoring the behavior of the vehicle, and wherein the one or more values of casing-profile deformation are measured along the axes of a three-dimensional Cartesian coordinate system.

40. A system for controlling behavior of a vehicle in motion, comprising: at least one unit for measuring one or more values of casing-profile deformation of at least one tyre of the vehicle;

a database comprising one or more predetermined values of deformation that represent behavior of the at least one tyre in a measured state of deformation; and a data processing unit receiving communications from the at least one unit for measuring;

wherein the data processing unit compares the one or more values of casing-profile deformation with the one or more predetermined values, wherein the data processing unit emits a signal used for controlling the behavior of the vehicle, and wherein the one or more values of casing-profile deformation are measured along the axes of a three-dimensional Cartesian coordinate system.

41. A wheel for a vehicle, comprising:

a rim that can be associated with a hub of the vehicle;

a tyre fitted on the rim;

an emitter of a signal; and a receiver of the signal;

wherein the tyre comprises a casing structure, comprising:
- a crown portion;
- a pair of axially-opposed sidewalls;
- beads for mounting the tyre on a corresponding rim; and
- at least one reinforcing ply comprising terminal flaps engaged with corresponding annular reinforcing structures embedded in the beads;
- wherein the crown portion extends between the sidewalls,
- wherein the casing structure terminates in the beads, wherein the signal is reflected within the wheel, wherein the receiver is adapted to measure deformations of the casing structure in vertical, transverse, and longitudinal directions.

42. A wheel for a vehicle, comprising:

a rim that can be associated with a hub of the vehicle;

a tyre fitted on the rim;

an emitter of a signal; and a receiver of the signal;

wherein the tyre comprises a casing structure, comprising:
- a crown portion;
- a pair of axially-opposed sidewalls;
- beads for mounting the tyre on a corresponding rim; and
- at least one reinforcing ply comprising terminal flaps engaged with corresponding annular reinforcing structures embedded in the beads;
- wherein the crown portion extends between the sidewalls,
- wherein the casing structure terminates in the beads, wherein the signal is reflected within the wheel, wherein the receiver is adapted to measure deformations of the casing structure along the axes of a three-dimensional Cartesian coordinate system.

43. An apparatus for a vehicle system, comprising:

a memory device; and a processor;

wherein the memory device is accessible by the processor, wherein the memory device comprises a data structure stored in the memory device, wherein the data structure interrelates predetermined pneumatic tyre casing-deformation data with pneumatic tyre performance data, wherein the processor retrieves performance data corresponding to measured tyre casing-deformation data from the memory device, and wherein the casing-deformation data comprises data related to deformations of a casing of at least one tyre of the vehicle in vertical, transverse, and longitudinal directions.

44. An apparatus for a vehicle system, comprising:

a memory device; and a processor;

wherein the memory device is accessible by the processor, wherein the memory device comprises a data structure stored in the memory device, wherein the data structure interrelates predetermined pneumatic tyre casing-deformation data with pneumatic tyre performance data, wherein the processor retrieves performance data corresponding to measured tyre casing-deformation data from the memory device, and wherein the casing-deformation data comprises data related to deformations of a casing of at least one tyre of the vehicle along the axes of a three-dimensional Cartesian coordinate system.

* * * * *

UNITED STATES PATENT AND TRADEMARK OFFICE
CERTIFICATE OF CORRECTION

PATENT NO. : 6,763,288 B2
DATED : July 13, 2004
INVENTOR(S) : Renato Caretta et al.

It is certified that error appears in the above-identified patent and that said Letters Patent is hereby corrected as shown below:

Title page,
Insert Item:
-- [30]   Foreign Application Priority Data
          July 30, 1999     (EP) .....................99114962.6 --.

Signed and Sealed this

Twelfth Day of October, 2004

JON W. DUDAS
*Director of the United States Patent and Trademark Office*